United States Patent [19]

Schumacher

[11] 4,352,515
[45] Oct. 5, 1982

[54] PIN-ACTUATED ROTATABLE RAM BAR APPARATUS AND CARRIER ADAPTER

[76] Inventor: John B. Schumacher, P.O. Box 657, Huron, S. Dak. 57350

[21] Appl. No.: 166,183

[22] Filed: Jul. 7, 1980

[51] Int. Cl.³ .............................................. B60R 19/02
[52] U.S. Cl. ............................. 293/145; 224/42.03 B; 403/93
[58] Field of Search ............... 293/145, 115, 118, 142, 293/143; 403/93 X, 96, 92; 224/42.03 R, 42.03 B

[56] References Cited

U.S. PATENT DOCUMENTS

| | | |
|---|---|---|
| 2,102,815 | 12/1937 | Weasler et al. ..................... 293/145 |
| 2,177,190 | 10/1939 | Sandberg . |
| 2,215,002 | 9/1940 | Jandus et al. . |
| 2,469,816 | 5/1949 | Dall . |
| 2,990,212 | 6/1961 | Nicastro . |
| 3,103,352 | 9/1963 | Steffen . |
| 3,173,717 | 3/1975 | Peras . |
| 3,210,110 | 8/1965 | Chieger . |
| 3,240,455 | 3/1965 | Swezy et al. . |
| 3,342,441 | 9/1967 | Danielson . |
| 3,370,878 | 2/1968 | Carr . |
| 3,451,710 | 6/1969 | Savell . |
| 3,709,542 | 1/1973 | Fehlau et al. . |
| 3,800,967 | 4/1974 | Kosecoff . |
| 3,841,544 | 10/1974 | Berger . |
| 3,877,622 | 4/1975 | McLain . |
| 3,937,451 | 2/1976 | Dipaola et al. . |
| 3,968,624 | 7/1976 | Allmendinger . |
| 3,972,456 | 8/1976 | Saffold . |
| 4,050,616 | 9/1977 | Mosow . |
| 4,088,253 | 5/1978 | Saffold . |

Primary Examiner—Robert R. Song
Attorney, Agent, or Firm—Finnegan, Henderson, Farabow, Garrett & Dunner

[57] ABSTRACT

A rotatable ram bar apparatus having at least one ram bar assembly for attachment to a vehicle bumper, the assembly including a ram bar the outer side of the vehicle bumper for securing the bar to the bumper, the bracket including a shaft extending horizontally therefrom. The shaft includes first and second pin-engaging apertures. A pin is slidably mounted within the ram bar, one end of pin engaging the first pin-engaging apertures when the ram bar is in the first position, wherein the bar extends vertically with respect to the vehicle bumper, and engaging the second pin-engaging aperture when the ram bar is in the second position wherein the bar is substantially parallel to the vehicle bumper.

16 Claims, 5 Drawing Figures

U.S. Patent
Oct. 5, 1982
4,352,515
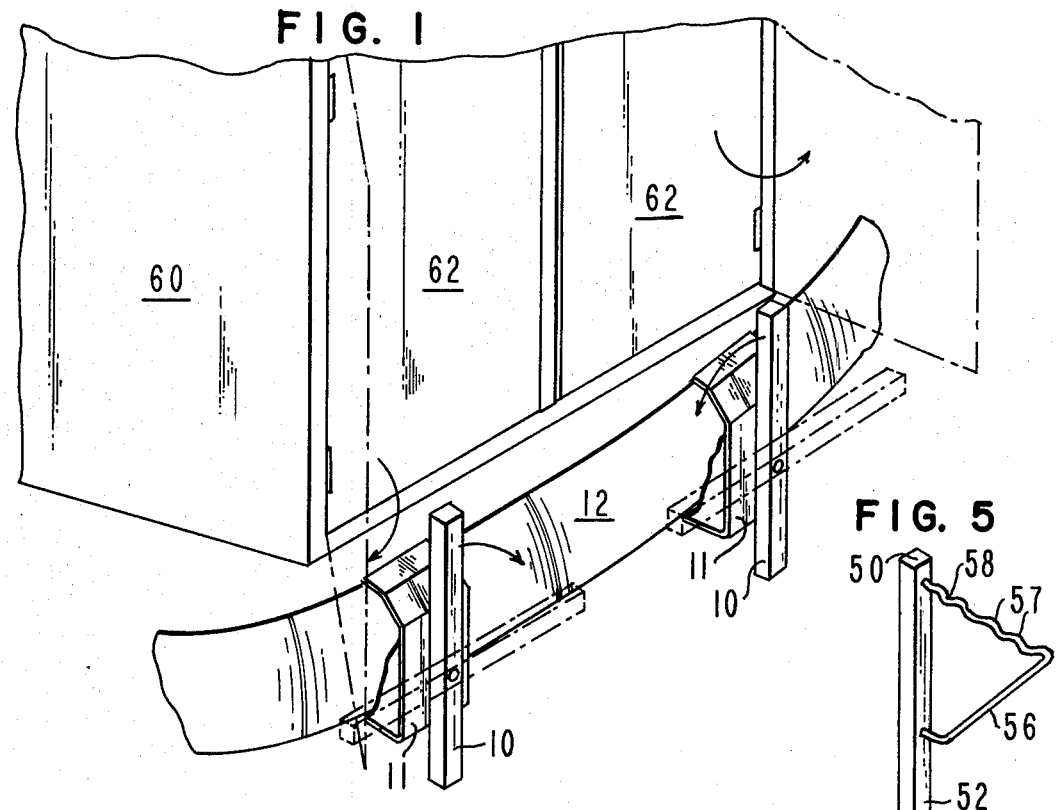
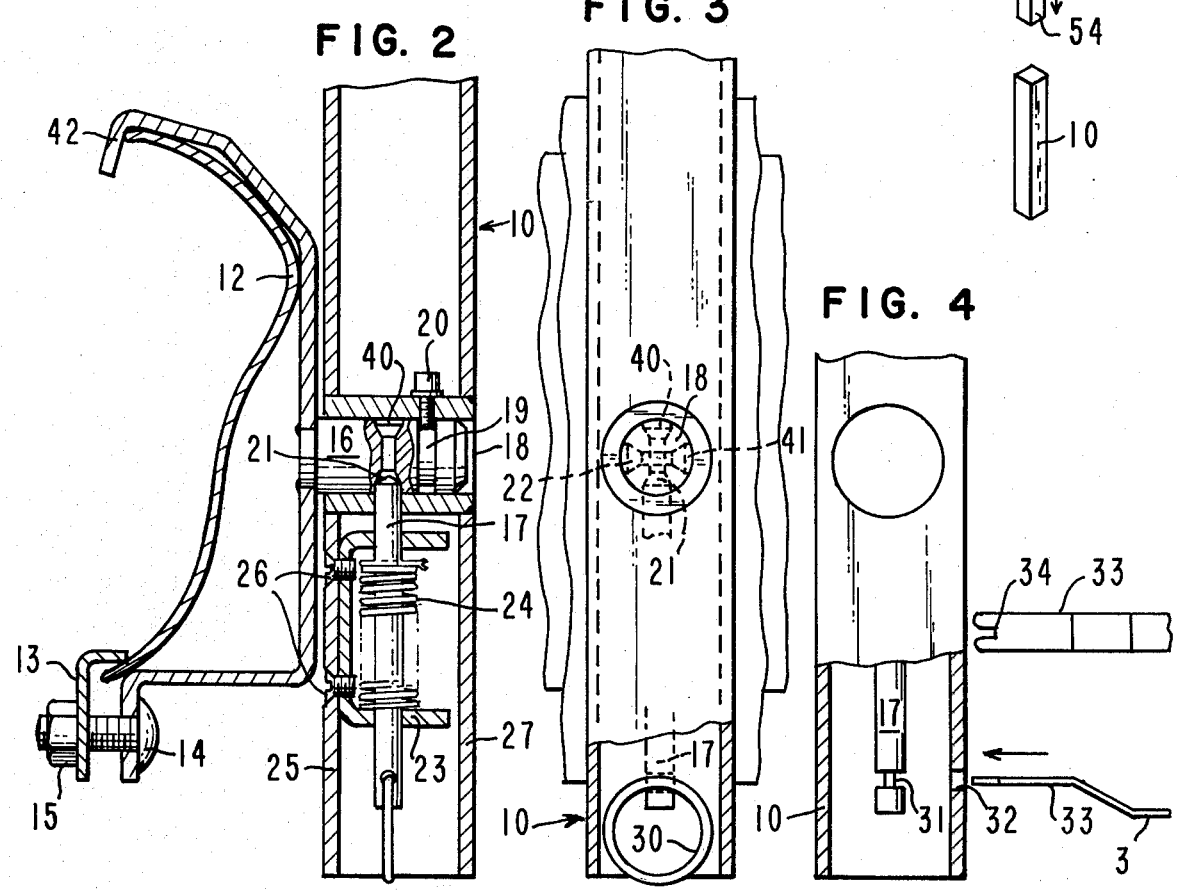

PIN-ACTUATED ROTATABLE RAM BAR APPARATUS AND CARRIER ADAPTER

BACKGROUND OF THE INVENTION

This invention relates generally to vehicle accessories and more particularly, to an improved ram bar assembly for wheeled vehicles. This application is related to U.S. patent application, Ser. No. 946,723 filed Sept. 28, 1978 for Rotatable Ram Bar Apparatus and Carrier Adapter by John B. Schumacher, the inventor herein.

In recent years a great deal of attention has been devoted to the design of vehicle bumpers which provide greater protection for the vehicle occupants. One structure which has been widely used, particularly on light trucks and other heavy duty vehicles, is a pair of vertical bars attached to the front bumper of the vehicle. In addition to providing greater protection for the vehicle, such bars allow the use of the vehicle to push other vehicles, without the danger of damaging the vehicle bumpers or having the bumpers lock together.

The use of such ram bars have been limited to the front of most vehicles, since their presence on the rear bumper of trucks or station wagons would impede the use of rear doors or tailgates. As a result, it has not been possible to achieve the significant degree of protection provided by such ram bars at the rear end of most rear access vehicles. This is particularly significant in the case of vans, since the rear bumper does not extend a significant distance away from the rear wall of such vehicles. Any excessive impact on the rear bumper on such a van could seriously damage the rear doors, and often causes the doors to spring open creating a dangerous condition, and increasing the possibility that children riding in the rear of the vehicle could be thrown out.

In addition, vehicle mounted article carriers such as bicycle racks, which have become particularly popular, interfere with the rear access of a vehicle if mounted on the rear bumper. Removal of such a carrier in order to open rear doors or a tailgate involves a great deal of time and effort.

Accordingly, it is a primary object of this invention to provide an improved ram bar assembly which may be rotated to allow access to the rear of a vehicle.

It is a further object of this invention to provide an improved ram bar assembly which may be easily locked in the vertical position or rotated to a horizontal position.

A still further object of this invention is to provide an improved article carrier for vehicular mounting which may be rapidly and easily removed from the vehicle, allowing ready access to the rear openings.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purpose of the invention, as embodied and broadly described herein, the rotatable ram bar apparatus of this invention has at least one assembly comprising a ram bar rotatable between first and second positions, means for securing the bar to the bumper, and pin-actuated means for retaining the bar in one of the first position wherein the bar extends vertically with respect to the vehicle bumper and the second position wherein the bar is substantially parallel to the bumper. Preferably, the securing means includes a bracket attachable to the outer side of the vehicle bumper, the bracket including a shaft protruding horizontally therefrom.

Preferably, the retaining means includes a pin slidably mounted within the ram bar, one end of the pin interacting with the shaft for holding the ram bar in the first position.

It is also preferred that the ram bar include a circular opening therein for receiving the shaft for rotation thereon, and the shaft include a cutout band portion in the circumference thereof. A protrusion or projection in the circular opening is preferably inserted into the band for securing the ram bar against axial movement on the shaft. The shaft preferably includes a first pin-engaging aperture therein, for engaging the pin when the ram bar is in the first position. The shaft also preferably includes a second pin-engaging aperture therein for engaging the pin when the ram bar is in the second position. Third and fourth pin-engaging apertures identical to and opposite the first and second pin-engaging apertures, respectively, may also be provided. Biasing means are preferably provided for urging the pin into one of the first and second pin-engaging apertures.

It is also preferred that the ram bar include a U-shaped member mounted therein for slidably supporting the pin, and the biasing means include a spring coiled about the pin within the area defined by the U-shaped member. The pin may include a ring mounted on the other end thereof for manually removing the pin from one of the first and second pin-engaging apertures against the bias of the spring.

Alternatively, the pin may include a collar portion on the other end thereof, and the ram bar may include horizontal slot aligned with the collar. A key dimensioned for insertion into the slot and the collar is provided for manually removing the pin from one of the first and second pin-engaging apertures against the bias of the spring.

It is also preferred that the ram bar apparatus include a pair of assemblies each having a carrier adapter for supporting an object such as a bicycle to be carried by the vehicle. The adapter preferably comprises bar extension means for attachment to the ram bars and holder means mounted on the extension means to provide the support.

BRIEF DESCRIPTION OF THE DRAWINGS

The accompanying drawings, which are incorporated in and constitute a part of this specification, illustrate one embodiment of the invention and, together with the description, serve to explain the principles of the invention.

Of the Drawings

FIG. 1 is a perspective view of a porion of a vehicle having rear doors with a pair of ram bar assemblies of the present invention attached to the rear bumper;

FIG. 2 is a sectional view taken along line 2—2 of FIG. 1;

FIG. 3 is a partial sectional view of a ram bar including a pin with a manually actuated ring thereon;

FIG. 4 is a partially cutaway side view of a ram bar embodiment including a pin with a collar and key; and FIG. 5 is a perspective view of the carrier adapter.

DETAILED DESCRIPTION OF THE PREFERRED EMBODIMENT

Reference will now be made in detail to the present preferred embodiment of the invention, an example of which is illustrated in the accompanying drawings.

Referring now to FIGS. 1 and 2, it may be seen that the ram bar apparatus is particularly useful on vehicles having rear entry doors or a tailgate. In accordance with the invention, the ram bar apparatus includes at least one assembly having a ram bar rotatable between first and second positions and means attachable to the outer side of a vehicle bumper for securing the bar to the bumper. As here embodied, a ram bar 10 has a rectangular cross section and is hollow, having opposed inner and outer sides 25 and 27, respectively. However, other cross-sectional configurations may be used and a substantially solid bar could also be used. Any suitable material which provides the necessary strength for the desired impact protection may be used. Metals such as aluminum or steel, and numerous plastics, are commercially available for such use. The bar may also be coated with a plastic material such as Lexan, a trademark of General Electric Company for thermoplastic carbonate-linked polymers produced by reacting bisphenol A and phosgene.

As here embodied, and as best shown in FIG. 2, the securing means includes a bracket 11 having an integral hook 42 on the upper end thereof, and a hooked fastener 13 on the lower end. The fastener 13 is attachable to the bracket 11 at the bottom thereof by a bolt 14 and a nut 15. The top portion of the bracket may also be provided with a hook fastener, if desired. Preferably, the bracket 11 is formed in the specific shape of the vehicle bumper to which it will be attached. Alternatively, the vertical level of the ram bar may be adjusted using the fastener 13, or suitable wedges (not shown). The bracket 11 preferably includes a shaft 16 protruding horizontally therefrom, the ram bar 10 being rotatably mounted on the shaft 16.

In accordance with the invention, the ram bar assembly also includes pin-actuated means for retaining the bar in one of the first position wherein the bar extends vertically with respect to the vehicle bumper and the second position wherein the bar is substantially parallel to the bumper. Preferably, the retaining means also includes a pin slidably mounted within the ram bar, one end of the pin interacting with the shaft for holding the ram bar in the first position. As here embodied, and as best shown in FIGS. 2 and 3, the retaining means includes a pin 17 slidably mounted within the ram bar 10. The pin 17 interacts with the shaft 16 for holding the ram bar in the first position. The ram bar 10 includes a circular opening 18 for receiving the shaft 16 for rotation thereon. In addition, the shaft 16 includes a cutout band portion 19 in the circumference thereof. The circular opening 18 has a projection 20 extending into the opening for insertion into the band portion 19, for securing the ram bar 10 against axial movement on the shaft 16. As shown in FIG. 2, the projection 20 may be a set screw which rides in the cutout band portion 19 upon rotation of the ram bar.

Preferably, the shaft 16 includes a first pin engaging aperture 21 therein, for engaging the pin 17 when the ram bar is in the first position. The shaft 16 may also include a second pin-engaging aperture 22 therein for engaging the pin 17 when the ram bar is in the second position. To allow for ease of rotation of the ram bar in either direction, third and fourth pin-engaging apertures 40 and 41 may also be provided in the shaft 16. The third pin-engaging aperture 40 is arranged opposite the first pin-engaging aperture 21 on the shaft 16, and the fourth and second pin-engaging apertures 41 and 22 are similarly arranged relative to each other.

Preferably, biasing means are provided for urging the pin into one of the first and second pin engaging apertures. As here embodied, the ram bar includes a U-shaped member 23 mounted therein for slidably supporting the pin 17. The biasing means includes a spring 24 coiled about the pin 17 within the area defined by the U-shaped member 23. One end of the spring 24 is fixed to the pin 17. The U-shaped member 23 is secured to the innerside 25 of the ram bar by suitable screws 26.

Preferably, the pin 17 has a ring 30 mounted on the lower end thereof for manually removing the pin 17 from the first and second apertures 21 and 22 against the bias of the spring 24. As shown in FIG. 3, the ring 30 may be easily accessed through the bottom of the hollow ram bar 10.

If further security is desired, the alternative in embodiment shown in FIG. 4 may be used. In this embodiment, the pin 17 includes a collar portion 31 on the lower end thereof. The ram bar 10 includes a slot 32 aligned with the collar 31. A key 33 which is dimensioned for insertion into the slot and for engagement with the collar is provided. In the upper view of the key 33 the collar-engaging portion 34 is shown. The key 33 is shaped to allow for manually removing the pin 17 from either of the first and second pin-engaging apertures 21 and 22 by a slight upward pressure on the end 35 of the key 34.

Preferably, as shown in FIG. 5, the ram bar assembly also includes a carrier adapter 50. In accordance with the invention, the adapter includes bar extension means for attachment to the ram bar, and holder means mounted on the extension means for supporting an object to be carried by the vehicle. As embodied herein, the extension means includes an extender bar 52 having one end 54 dimensioned for insertion into the portion of the ram bar 10. The holder means includes a brace 56 having a portion 57 extending horizontally from the extender bar 52. Preferably, the horizontal portion 57 includes notch means for securing an object to be carried. As embodied herein, the notch means includes at least one indentation 58 for receiving the tubular frame of a bicycle. The indentation 58 may also be fitted with a spring clip device (not shown) for securing the bicycle frame without the need for additional straps or fastening devices. This allows for easier and faster loading and unloading of a bicycle. It is, of course, necessary to utilize a pair of ram bar assemblies to support a normal bicycle frame.

As is readily apparent from FIG. 1, the individual ram bar assemblies may each be easily rotated to a horizontal position out of the path of the rear doors or other rear closure devices of the vehicle on which they are mounted. In FIG. 1, a typical vehicle 60 is supplied with rear doors 62. When the ram bars 10 are in the vertical position, they prevent the door 62 from being opened fully. In order to obtain access to the rear of the vehicle, it is only necessary to exert a moderate pressure downwardly on the pins 17 in each of the ram bar's 10, and to rotate the bars to a position parallel to the vehicle bumper 12. Only a moderate downward pressure on the pin 17 is necessary to overcome the bias of the spring 24 and disengage the pin 17 from one of the pin-engaging apertures 21 and 22. A slight rotational movement in either direction on the ram bar 10 causes the bar to rotate until the pin 17 engages with the next pin-engaging aperture aligned therewith.

The ram bar assemblies are intended to be used in pairs, with the pin-engaging apertures designed to allow rotation in either direction. However, alternative designs utilizing two pin-engaging apertures may be used if rotation in only one direction is desired.

In addition to providing increased vehicular protection upon impact, the ram bar substantially prevents any rear doors from springing open. Thus, the invention provides a significant safety feature which reduces the likelihood that persons riding in the rear of the vehicle will be thrown out on impact.

The carrier adapter 50 may be held in place by the weight of the articles to be carried, or separate securing means may be provided in the lower end 54 of the extender bar 52. The securing means preferably includes a pair of spring loaded balls which fit into corresponding holes in the top of the ram bar 10 (not shown). Other suitable securing means are known to those skilled in the art.

Thus, the ram bar assembly provides increased vehicular impact protection, is simple to install and operate, has a minimum of moving parts, and may be readily adapted as a carrier for bicycles or other heavier objects. By providing a device combining these features and those disclosed above, the present invention constitutes a significant advance in the art.

It will be apparent to those skilled in the art that various modifications and variations could be made in the structure of the invention without departing from the scope or spirit of the invention.

What is claimed is:

1. A rotatable ram bar apparatus having at least one ram bar assembly for mounting on a vehicle bumper, said assembly comprising:
   a ram bar rotatable between first and second positions;
   means for securing said bar to said bumper including a bracket attachable to the outer side of said vehicle bumper; and
   pin-actuated means for retaining said bar in one of said first position wherein said bar extends vertically with respect to said vehicle bumper and said second position wherein said bar is substantially parallel to said bumper,
   said bracket including a shaft protruding horizontally therefrom, said ram bar being rotatably mounted on said shaft, and said retaining means including a pin slidably mounted within said ram bar, one end of said pin interacting with said shaft for holding said ram bar in said first position.

2. The rotatable ram bar assembly of claim 1 wherein said ram bar includes a circular opening therein for receiving said shaft for rotation thereon.

3. The rotatable ram bar assembly of claim 2 wherein said shaft includes a cut-out band portion in the circumference thereof, and said circular opening includes a projection therein for insertion into said band portion for securing said ram bar against axial movement on said shaft.

4. The rotatable ram bar assembly of claim 3 wherein said shaft includes a first pin-engaging aperture therein, for engaging said pin when said ram bar is in said first position.

5. The rotatable ram bar assembly of claim 4 wherein said shaft also includes a second pin-engaging aperture therein, for engaging said pin when the ram bar is in said second position.

6. The rotatable ram bar assembly of claim 5 wherein said shaft also includes third and fourth pin-engaging apertures therein, for engaging said pin when said ram bar is in said first and second positions, respectively.

7. The rotatable ram bar assembly of claim 5 also including biasing means for urging said pin into one of said first and second pin-engaging apertures.

8. The rotatable ram bar assembly of claim 6 wherein said ram bar includes a U-shaped member mounted therein for slidably supporting said pin, and said biasing means includes a spring coiled about said pin within the area defined by said U-shaped member one end of said spring being fixed to said pin.

9. The rotatable ram bar assembly of claim 8 wherein said pin has a ring mounted the other end thereof for manually removing said pin from one of said first and second apertures against the bias of said spring.

10. The rotatable ram bar assembly of claim 8 wherein said pin includes a collar portion on the other end thereof, said ram bar includes a slot aligned with said collar portion, and said apparatus includes a key dimensioned for insertion into said slot and said collar for manually removing said pin from one of said first and second pin-engaging apertures against the bias of said spring.

11. The rotatable ram bar assembly of claim 8 also including a carrier adapter, said adapter comprising bar extension means for attachment to said ram bar, and holder means mounted on said extension means for supporting an object to be carried by said vehicle.

12. The rotatable ram bar assembly of claim 11 wherein at least the top portion of said ram bar is hollow and said extension means includes an extender bar having one end dimensioned for insertion into the hollow portion of said ram bar at the top end thereof.

13. The rotatable ram bar assembly of claim 12 wherein said holder means includes a brace, at least a portion of said brace extending horizontally from said extender bar.

14. The rotatable ram bar assembly of claim 13 wherein the horizontal portion of said brace includes notch means for securing an object to be carried.

15. The rotatable ram bar assembly of claim 14 wherein said notch means includes at least one indentation dimensioned for receiving an object having a tubular frame portion.

16. The rotatable ram bar apparatus of claim 11, including a pair of said assemblies mounted in spaced apart relation on said vehicle bumper for supporting two portions of an object.

* * * * *